No. 675,388. Patented June 4, 1901.
R. M. KEATING.
MOTOR BICYCLE.
(Application filed July 5, 1900.)
(No Model.) 2 Sheets—Sheet 1.
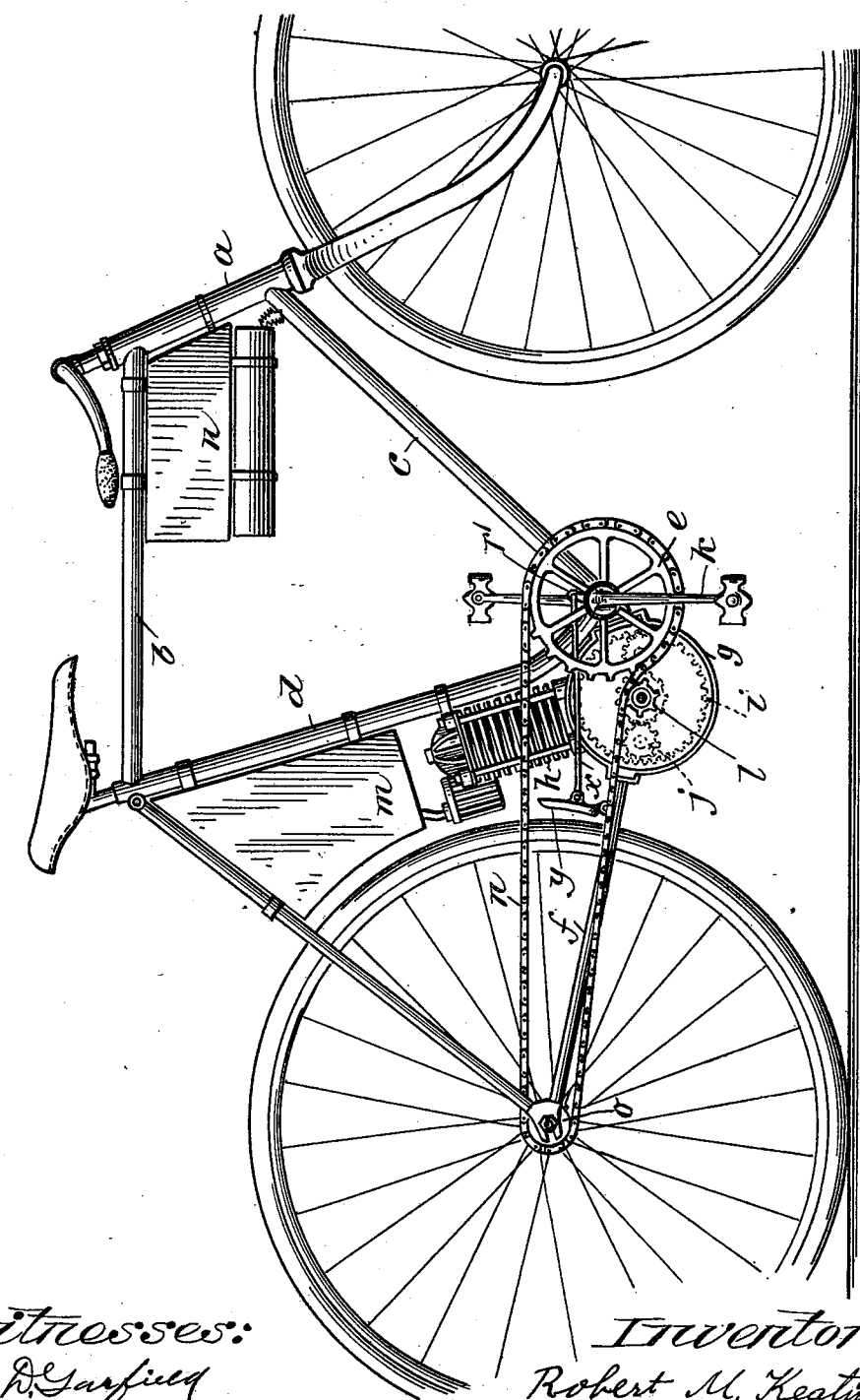
Fig. I.
Witnesses:
J. D. Garfield
S. Sweeney.
Inventor,
Robert M. Keating
by Webster & Tilley
Attorneys.

No. 675,388. Patented June 4, 1901.
R. M. KEATING.
MOTOR BICYCLE.
(Application filed July 5, 1900.)
(No Model.) 2 Sheets—Sheet 2.
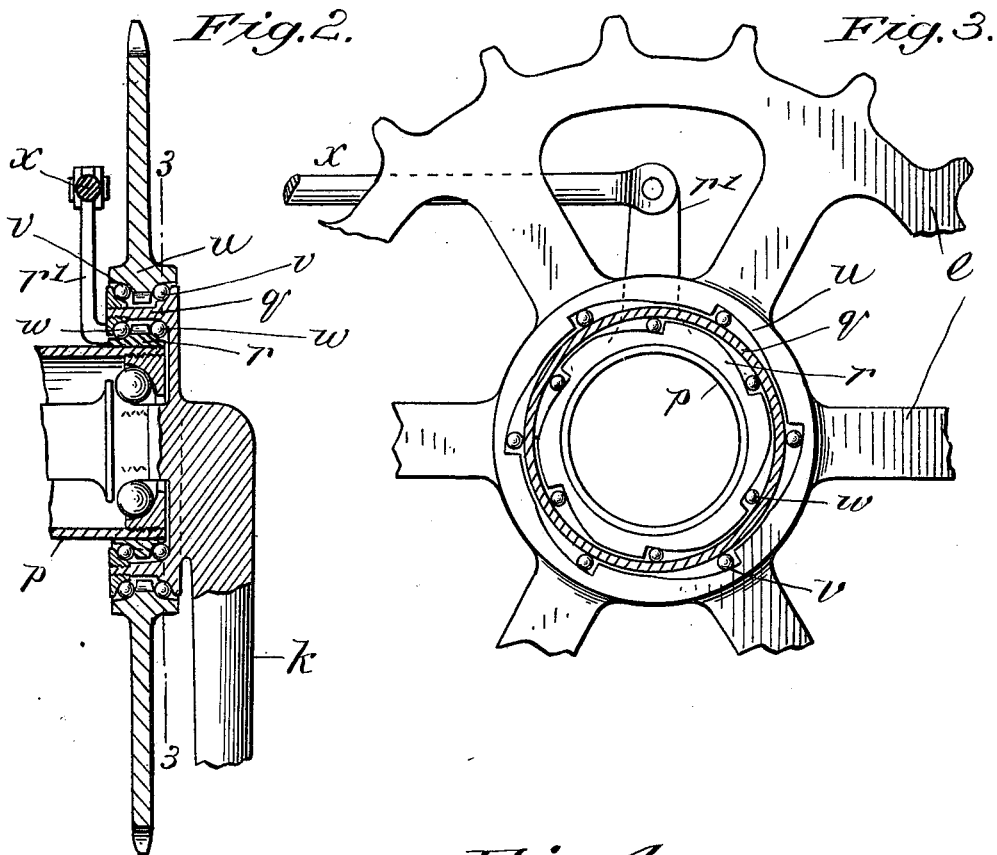
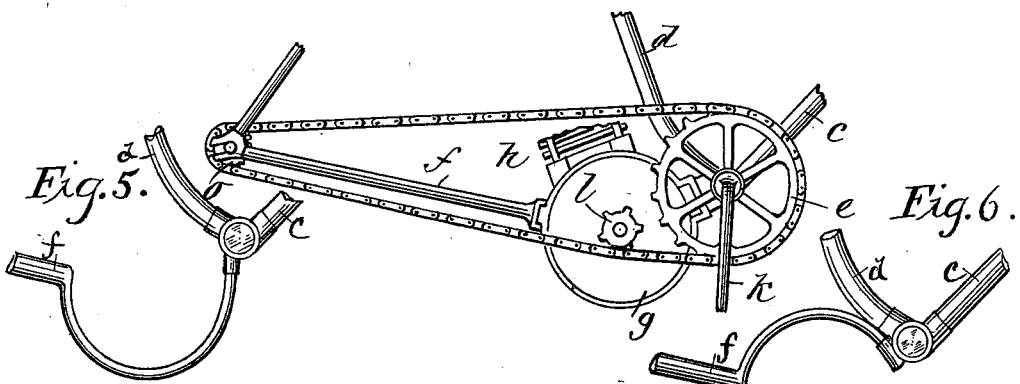
Witnesses:
J. D. Garfield
S. Sweeney
Inventor
Robert M. Keating
by Webster & Tilley
Attorneys.

UNITED STATES PATENT OFFICE.

ROBERT M. KEATING, OF MIDDLETOWN, CONNECTICUT, ASSIGNOR TO R. M. KEATING MOTOR COMPANY, OF PORTLAND, MAINE.

MOTOR-BICYCLE.

SPECIFICATION forming part of Letters Patent No. 675,388, dated June 4, 1901.

Application filed July 5, 1900. Serial No. 22,479. (No model.)

*To all whom it may concern:*

Be it known that I, ROBERT M. KEATING, a citizen of the United States of America, residing at Middletown, in the county of Middlesex and State of Connecticut, have invented new and useful Improvements in Motor-Bicycles, of which the following is a specification, reference being had to the accompanying drawings and letters of reference marked thereon.

The object of my invention is to provide a motor-bicycle which shall be light, strong, and serviceable.

In the accompanying drawings, in which like letters of reference indicate like parts, Figure 1 illustrates a bicycle construction in accordance with my invention. Fig. 2 is a vertical view in section of the pedal sprocket-wheel and clutch mechanism. Fig. 3 is a side view of the same, these two figures being on a scale very much larger than Fig. 1. Fig. 4 illustrates a modification wherein the motor sprocket-wheel operates on the sprocket-chain from above instead of below, as shown in Fig. 1; and Figs. 5 and 6 are side views illustrating modifications in the construction of the lower rear bars, whereby the motor-shell $g$ may be conveniently secured thereto.

In detail, $a$ indicates the head; $b$, the top bar; $c$, the lower front bar; $d$, the seat-post bar or center brace; $e$, the pedal sprocket-wheel; $f$, lower rear bars; $g$, motor supporting-shell; $h$, motor; $i$, internal gear; $j$, intermediate or idler gear; $k$, crank-arm; $l$, motor sprocket-wheel; $m$, fuel-reservoir and carbureter; $n$, battery; $o$, rear-wheel sprocket; $p$, crank-hanger bracket; $q$, annular flange on crank-arm; $r$, clutch or brake ring; $u$, hub of sprocket-wheel; $v$ and $w$, balls; $x$, brake-rod, and $y$ brake.

The construction and operation of my device will be readily understood on reference to the drawings, wherein in Fig. 1 I illustrate a bicycle-frame similar to those now in common use, excepting that the shell or frame $g$ is arranged between the crank-hanger bracket and the forward ends of the lower horizontal bars.

I prefer to arrange a suitable gear or other reducing mechanism of any convenient type, preferably supported by the shell, whereby the motion of the sprocket-wheel which engages the sprocket-chain is reduced below the number of revolutions of the motor.

The construction of frame herein described, and illustrated in the drawings, enables me to bring the motor sprocket-wheel to a point where it engages the sprocket-chain extending from the pedal sprocket-wheel to the rear sprocket-wheel.

To do away with the revolution of the pedals when the bicycle is being driven by the motor, I arrange a mechanism similar to that known as a "coaster-brake" in the crank-hanger bracket, the same being so constructed that when the pedal-cranks are revolved in a direction to drive the bicycle forwardly they engage the sprocket-wheel and rotate the same, and when a motion the reverse of that described is given to the pedal-cranks the cranks are unlocked and the sprocket-wheel is free to revolve independently. I illustrate one means of accomplishing this result, which in detail is as follows:

The crank-hanger bracket $p$ has mounted upon it a ring $r$, its periphery being provided with a series of V-shaped openings, as shown in the drawings in Fig. 3, one side of said openings being in a line extending substantially toward the center and the other forming a long incline, which openings are adapted to receive balls, as shown, or antifriction-rolls may be employed instead of balls, the shape of the openings being of course adapted to same. Outside the brake-ring $r$ and mounted upon the balls in said recesses I arrange the annular flange $q$, which is a part of and preferably formed integral with the pedal crank-arm $k$. The sprocket-wheel $e$ is provided with ball-recesses similar to those in the brake-ring $r$, but arranged with the long incline in reverse direction, so that when the pedal is revolved in a direction to rotate the sprocket-wheel $e$ forwardly, as indicated by the arrow, the balls $v$, located in the recesses in the sprocket-wheel, (between the outer surface of the annular flange $q$ and the inner surfaces of said openings,) will be carried up the gradual incline and lock the sprocket-wheel $e$ to the annular flange $q$, and thus the sprocket-wheel $e$ will be revolved by the action of the pedal-cranks. When, however, the sprocket-wheel $e$ is revolved forwardly by the action of the motor, if the pedals are at rest, then the forward rotating motion of the sprocket-wheel $e$ will cause the balls $v$ to remain in the lowest or deepest portion of said openings, thus operating to unlock the sprocket-wheel $e$ from the annular flange $q$ and allow the sprocket-wheel $e$ to revolve independently of the pedals, so that while the motor is operating to drive the bicycle forwardly the pedals will remain at rest until such time as the rider may desire to supplement the motion imparted by the motor by operating the pedals, and if then the rider rotate the pedals forwardly with sufficient rapidity the annular flange $q$ becomes locked to the sprocket-wheel $e$ and the bicycle will be driven forwardly by the combined force of the rider and the motor. This mechanism enables the rider to start the motor of the ordinary gas or explosion type by mounting the wheel and revolving the pedals forwardly, after which the rider may stop pedaling and hold the pedals at rest, and thus release the locking mechanism, and the bicycle will then be driven forward by the action of the motor, and the pedals, as before stated, may remain at rest.

For the purpose of enabling the rider to apply a brake to the device when desired an arm $r'$ is suitably attached to ring $r$, and a further backward movement of the pedals operates to lock the ring $r$ to the annular flange $q$, so that a backward movement of the pedals a sufficient distance will lock the ring $r$ to the pedal-cranks and move said ring $r$ rearwardly, carrying with it the brake-arm $r'$, thus moving the brake-rod attached thereto rearwardly, forcing the brake $y$ backward and against the rear wheel of the bicycle, thus enabling the rider to gradually bring the vehicle to rest.

The motor is preferably arranged at the rear of the seat-post bar or center brace and at an elevation to bring the motor sprocket-wheel to a position where it will engage the sprocket-chain extending from the pedal sprocket-wheel to the rear sprocket-wheel, so that the sprocket-wheel driven by the motor will engage the same sprocket-chain that is employed in driving the bicycles from the pedals. It will readily be seen, however, that the position of the latter may be varied—that is to say, it may be lowered and this sprocket-wheel arranged to engage the sprocket-chain on the upper surface of the lower portion of the chain, as shown in Fig. 4, or the motor or motor sprocket-wheel may be elevated, so as to engage the chain in its passage toward the pedal sprocket-wheel.

While I prefer that the motor be arranged, as shown in Fig. 1, just back of the center brace $d$ and that it be provided with a shell or case $g$, forming a connecting-link between the crank-hanger bracket and the lower rear bars $f$, I do not limit myself to this construction, as the shell $g$ might be supported between the lower rear bars $f$ and said bars arranged to extend from the rear bracket to the crank-hanger bracket and either pass at each side of said case $g$ or through the same. As an alternative construction, in place of securing the ends of the lower rear bars $f$ to the shell $g$ I may form these bars with a downward or an upward curve, as shown in Figs. 5 and 6, and secure the forward ends to the crank-hanger bracket in any convenient manner, and if the downward curve is employed then the shell $g$ may rest therein and be readily secured thereto, and if the upward curve is employed then the upper portion of the shell $g$ would by preference be secured to said upward-curved portion of said bars.

The center brace of the frame is preferably curved forwardly at its lower end, as shown in Fig. 1 of the drawings. This enables me to bring the brace to the most desirable position with reference to the frame and to locate the motor-cylinder closely adjacent to the center brace, and saving of space results, because the shell $g$ may be located closely adjacent to the crank-hanger bracket, as the curve in the brace $d$ is such as to permit the shell $g$ to lie closely adjacent to the crank-hanger bracket, and if it were thought desirable to locate the motor forwardly of the center brace $d$ the curve would then be of benefit, as the shell $g$ could be located with its center nearer the crank-hanger bracket than it could were this brace straight.

I do not limit myself to any particular mechanism for changing the speed of the motor as it is applied to the driving mechanism, as it will readily be observed that various different mechanisms may be employed for that purpose, and while I deem it best to arrange the device so that the motor-driving mechanism engages the sprocket-chain from below and adjacent to the sprocket-wheel $e$ it will readily be seen that the object of my invention will be attained by arranging the engagement either as shown in Fig. 1 or as shown in Fig. 4, or otherwise.

While the arrangement of brake mechanism illustrated is desirable, it is not necessary to the successful operation of a motor-bicycle.

Having therefore described my invention, what I claim, and desire to secure by Letters Patent, is—

1. In a motor-bicycle, the frame consisting essentially of the steering-head, top bar, lower front bar, lower and upper rear bars, and seat-post bar or center brace arranged as described, a crank-hanger bracket at the junction of the lower front bar and the seat-post bar, and having a crank and driving sprocket-wheel, driving mechanism extending from said sprocket-wheel to the rear hub as usual, and a motor-engine secured to the center brace, in rear thereof, and having a sprocket-pinion engaging the driving mechanism which connects to the rear hub, substantially as described.

2. In a motor-bicycle as described, the combination with the diamond frame of usual form, of a motor-engine secured to the rear side of the seat-post and supported by the lower rear bars of the frame, a crank-hanger at the junction of the seat-post and lower front bar, the crank, and driving-sprocket connected thereto as described, the sprocket-chain extending from the driving-sprocket to the rear hub as usual, a driving-motor secured in rear of the seat-post and engaging the sprocket-chain, and a clutch-gear interposed between the crank and driving-sprocket, so that the motor may drive the chain, or may be reinforced by the crank, substantially as described.

3. In a motor-bicycle, the pedal crank-shaft having clutch engagement with the driving sprocket-chain, the driving-motor having direct driving engagement with the same sprocket-chain, and a brake mechanism connected to a clutch operating by the back-pedaling of the pedals, while the driving-pinion runs free of the pedals, all combined substantially as described.

4. In a motor-bicycle, the crank-hanger bracket having a ring on its periphery and provided with inclined surfaces, the pedal-crank having a sleeve surrounding said ring, a series of clutch-balls between said sleeve and ring, the driving sprocket-hub surrounding said sleeve and operating to engage the same by clutch action in one direction only, the driving-chain connected to said driving-sprocket and rear-wheel hub, and the motor acting directly on the driving-chain.

5. The combination in a motor-cycle, of a suitable frame having its center brace curved at its lower end portion, and a motor operatively connected with the cycle-wheel and located closely adjacent to said curved portion of said bar.

ROBERT M. KEATING.

Witnesses:
 ALLEN WEBSTER,
 THOMAS E. IRWIN.